Patented Oct. 7, 1941

2,258,320

UNITED STATES PATENT OFFICE

2,258,320

MONOALKYLOL CYANAMIDE CONDENSATION PRODUCT

Walter P. Ericks, Cos Cob, Conn., assignor to American Cyanamid Company, New York, N. Y., a corporation of Maine No Drawing. Application June 10, 1939, Serial No. 278,456

11 Claims. (Cl. 260—248)

This invention relates to condensation products of monoalkylol cyanamides or polymerized monoalkylol cyanamides with organic monocarboxylic acids, and to surface-active compositions containing these condensation products. I have found that a new class of condensation products is obtained when monoalkylol cyanamides such as monoethylol cyanamide or its dimer, diethylol dicyandiamide, is heated with an organic monocarboxylic acid such as aliphatic or aromatic monocarboxylic acids in suitable amounts.

My new condensation products are surface-active agents of the cation-active type; that is to say, their surface-active properties are due to the electropositive portion of the molecule. For this reason they are well suited for wetting and softening wool, cotton, cellulose acetate, cellulose nitrate, viscose and similar threads and fabrics, as emulsifying agents for the preparation of emulsions of hydrocarbon oils, glyceride fats and oils and the like, as well as for demulsification of oil emulsions, in the formulation of printing inks, dye pastes, dye baths, as softeners for leather, as flotation agents, in the application of rubber latex emulsions to wool and cotton textiles, in preparing emulsions of resins and the like.

Monoalkylol cyanamides may be prepared according to known methods by treating an aqueous solution of sodium cyanamide with, for example, ethylene chlorhydrin at low temperatures followed by acidification with hydrochloric acid. I have also found that the same class of materials is obtained when sodium cyanamide or other suitable cyanamide compounds are reacted with one or more molecules of an alkylene oxide such as ethylene oxide, propylene oxide, the methyl, ethyl or propyl ether of ethylene glycol and the like or with compounds containing such groups as 5.6 anhydro-monoacetone glucose. When equimolecular ratios of the cyanamide salt and alkylene oxide are used a simple alcohol derivative is obtained, but when two or more moles of the alkylene oxide are reacted with each mole of the cyanamide derivative there are obtained ether alcohol derivatives which I have designated as alkoxyalkylol cyanamides. The exact chemical constitution of these compounds may vary with varying conditions of acidity, alkalinity, etc., but I believe that the following is a representative formula: NC.NH.R.OH in which R is either an alkyl or an alkoxy radical, depending on whether one or several moles of alkylene oxide were reacted with each mole of cyanamide. The products are all extremely reactive, and polymerize readily upon heating to the dimer which has the following probable structural formula

HN=C.NH.R.OH
|
N≡C.N.R.OH in which R is as defined above. Upon additional heating further polymerization may occur.

When an alkylol cyanamide or its polymer is heated with an organic monocarboxylic acid a condensation takes place which produces waxy or syrupy materials having definite surface-active properties. When the two classes of materials are simply mixed without heating a product is obtained which is probably a salt of the acid, for it is soap-like in character and foams upon shaking. This product is easily decomposed by acids. I have found, however, that when the same mixture is heated, preferably to temperatures of 110–160° C. a further condensation takes place with evolution of water, the product of which is a surface-active agent that is resistant to acids and only slowly attacked by alkalies. This condensation product, its method of preparation and its uses constitute the subject matter of the present invention.

I have not as yet been able to demonstrate conclusively the structural formula of my new condensation products. I believe that they are cyclic in character, by reason of their resistance to high temperatures and strong acids, and it is certain from their surface-active characteristics that they contain free hydroxyalkyl groups. I therefore suggest the following structural formula and reaction mechanism for the preparation of these compounds with the understanding that they are subject to further verification.

$$2N\equiv C.NH.R.OH \rightarrow \begin{array}{c} HN=C.NH.R.OH \\ | \\ N\equiv C.N.R.OH \end{array} +$$

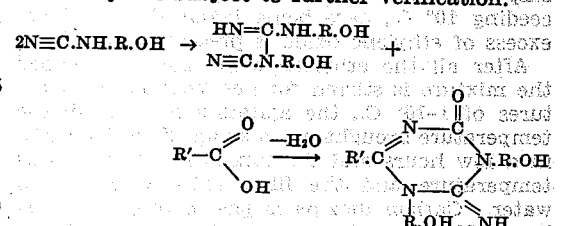

in which R is a member of the group consisting of alkyl and alkoxyalkyl radicals and R' is a member of the group consisting of alkyl and aryl radicals. If this formula is correct, my new products may be considered as derivatives of isocyanuric acid.

The alkylol cyanamides which I have heated with organic monocarboxylic acids include monoethylol cyanamide, monoethoxyethylol cyanamide, triethoxyethylol cyanamide, monoisopropylol cyanamide, mono-n-butylol cyanamide, mono-2,3-dihydroxypropyl cyanamide and mono-2-hydroxy-3-chloropropyl cyanamide and since all these compounds react in substantially the same manner to give products of the same general characteristics it is reasonable to conclude that any alkylol cyanamide may be used for this purpose. I have carried out the condensation using a large number of different aliphatic and aromatic monocarboxylic acids including acetic acid, butyric acid, caproic acid, lauric acid, stearic acid and palmitic acid as well as such aromatic acids as benzoic acid and o-toluic acid and in all cases the reaction mechanism appears to be the same. I believe, therefore, that the condensation is perfectly general in character and will operate with any alkylol cyanamide and any organic monocarboxylic acid to produce condensation products which are surface-active agents of the cation-active type.

The invention will be illustrated in greater detail by the following specific examples. It should be understood, however, that these examples are given primarily for purposes of illustration, and that although they may describe certain of the more specific details of the invention its broader aspects are not limited thereto.

EXAMPLE 1

*Preparation of monoethylol cyanamide*

This material can be prepared by treating an aqueous solution of sodium cyanamide with ethylene chlorhydrin at low temperature followed by acidification with hydrochloric acid. It can be freed from sodium chloride and other impurities by evaporation of water and extraction with alcohol. Upon evaporation of the alcohol an oily, pale yellow liquid is obtained which is soluble in alcohol and in water in all proportions. The same product can be obtained by reacting calcium cyanamide with ethylene chlorhydrin.

I have developed a much better process for manufacturing the same material in commercial quantities. This process is based on the use of calcium cyanamide, sodium cyanamide, or any similar cyanamide compound together with ethylene oxide, which is relatively cheap and easily available in large quantities. The calcium cyanamide is introduced slowly and with vigorous agitation into water at a temperature not exceeding 30° C., and the mixture is cooled during 30 minutes to 5° C. with continued stirring. An equimolecular amount of ethylene oxide is then introduced slowly into the agitated suspension at a temperature preferably not exceeding 10° C., care being taken that no large excess of ethylene oxide is present at any time. After all the ethylene oxide has been added the mixture is stirred for one hour at temperatures of 1–10° C., the agitation is stopped, the temperature brought up to about 25–30° C. within a few hours and the mixture filtered at this temperature and the filter cake washed with water. Carbon dioxide is passed into the combined filtrate and washings to precipitate the calcium as carbonate, which is filtered off, and the filtrate is evaporated at low temperatures until a thick, oily syrup is obtained. As the product polymerizes readily, high evaporation temperatures should be avoided and it is preferable to carry out the evaporation under reduced pressures of 10–20 mm. of mercury.

EXAMPLE 2

*Preparation of monoethoxyethylol cyanamide*

This material is obtained when two moles of ethylene oxide are combined with each mole of cyanamide. Calcium cyanamide is suspended in water as in Example 1 and converted to sodium cyanamide by the addition of a sodium hydroxide solution at 15° C. The solution is then cooled to 5° C. and a total of 4.5 molecules of ethylene oxide for each 2 molecules of cyanamide present are added at such a rate that the temperature of reaction is maintained below 10° C. The mixture is then agitated for several hours and preferably permitted to stand so that its temperature may rise slowly to that of the surrounding atmosphere. It is then filtered, the filtrate extracted with chloroform and the chloroform extract evaporated under reduced pressures.

EXAMPLE 3

*Preparation of triethoxyethylol cyanamide*

This material was prepared by the reaction of 4 moles of ethylene oxide for each mole of cyanamide. The reaction was carried out in the presence of water in a pressure autoclave provided with heating and agitating means. The reaction cycle was as follows:

| Time (min.) | Temp., °C. | Pressure, lbs./sq. in. |
|---|---|---|
| 5 | 30 | No pressure indicated. |
| 10 | 40 | Do. |
| 15 | 50 | 30. |
| 20 | 64 | 40. |
| 25 | 73 | 50. |
| 30 | 84 | 60. |
| 35 | 92 | 70. |
| 40 | 103 | 50. |
| 45 | 108 | 40. |
| 50 | 105 | 30. |
| 55 | 105 | 25–30. |
| 60 | 105 | 20–25. |
| 65 | 105 | 20–22. |
| 70 | 103 | 20 or less. |

The autoclave was then slowly cooled to room temperature, the slurry was filtered, and the filter cake was washed with small portions of water. Carbon dioxide was passed through the combined filtrate and washings to precipitate calcium carbonate which was filtered off, and the filtrate was evaporated until a viscous syrup was obtained.

EXAMPLE 4

*Preparation of mono-isopropylol cyanamide*

Calcium cyanamide was suspended in water and an equimolecular quantity of propylene oxide was slowly introduced at low temperatures, using the procedure described in Example 1. After filtering off the calcium hydroxide formed and the original inert materials present in the cyanamide, the filtrate was treated with carbon dioxide, filtered, and the filtrate evaporated to dryness at low temperatures. The product was obtained as a viscous, yellow-colored liquid which polymerized readily upon heating.

EXAMPLE 5

*Preparation of mono-2,3-dihydroxy propyl cyanamide*

A slurry of calcium cyanamide in water was prepared as described in Example 1 and an equimolecular quantity of glycidol

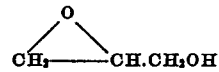

was slowly added with continuous stirring. The resulting slurry was allowed to stand for a time and was then filtered. The filtrate was treated with carbon dioxide to precipitate calcium carbonate which was filtered off, and the filtrate from this step was evaporated as described in previous examples. The product was a viscous syrup.

EXAMPLE 6

Preparation of 2-hydroxy-3-chloro propyl cyanamide

A slurry of calcium cyanamide in water was prepared in the usual manner and an equimolecular amount of epichlorhydrin was added with continuous agitation, using positive cooling to maintain the mixture at temperatures well below 25° C. The resulting slurry was filtered, the filtrate treated with carbon dioxide and again filtered, and the liquid evaporated at low temperatures in the usual manner.

EXAMPLE 7

189 parts of monoethylol cyanamide, prepared as in Example 1, were mixed with 256 parts of palmitic acid and the mixture was heated slowly to 155° C. Upon cooling a thick paste was obtained which was soluble in acids, readily dispersible in water and sparingly soluble in alkalies.

The product was found to have both foaming and emulsifying properties. As an emulsifying agent it is unusual in that it produces emulsions of the water-in-oil type with hydrocarbons and of the oil-in-water type with glyceride oils and fats such as olive oil.

Twenty parts by volume of olive oil were emulsified with 80 parts of an 0.5% water solution of the condensation product simply by shaking the mixture. The emulsion was stable even after standing for long periods.

When 10 parts of kerosene and 90 parts of water containing 0.2 part of the product were shaken together a thick, creamy emulsion was formed. Round, white globules were obtained when this emulsion was poured into water, showing that water was originally the disperse phase.

The condensation product was also a good softening agent for textiles, such as cloth, yarn, threads, rayon and cellulose acetate fiber and the like. A piece of 64 x 60 mesh cotton cloth was dipped into a 3% aqueous solution of the product for 1 minute at 160° F. The cloth was then put through a wringer, dried at 250° F. and conditioned for one hour. Its softness was then determined by comparison with a piece of the same cloth similarly treated with a standard commercial softening agent known to the trade as "No-Odorol-NRT 90%." Both pieces were then treated for 15 minutes with a solution of 0.5% soap and 0.25% sodium carbonate at 160° F. to determine the scouring properties. After washing and drying at 250° F. the pieces were again compared. It was found that the softening power of the above described condensation product was greater than that of the "No-Odorol," and that it was removed to the same extent upon scouring.

EXAMPLE 8

200 parts of coconut fatty acids were mixed with 189 parts of the monoethylol cyanamide. The temperature immediately rose to 50° C., whereupon heat was applied and the temperature slowly carried to 150° C. The product was similar in appearance and properties to that of Example 7.

Woolen cloth was impregnated with a 3% aqueous solution of the material, wrung out and dried. A well-softened piece of cloth was obtained.

EXAMPLE 9

The process of the preceding example was repeated using lauric acid instead of the crude coconut fatty acids. 15 gram moles of ethylol cyanamide and 7.5 gram moles of lauric acid (NeoFat No. 11, Armour & Co.) were mixed without external heating, whereupon the temperature rose to 50° C. as before. The first product of reaction was evidently the salt of the acid, since a sample foamed when shaken with water, but the foaming ceased when acid was added. The reaction mixture was then slowly heated to 160° C. in about 2 hours, and was maintained at this temperature for 30 minutes. A light-colored, soft, waxy material was then obtained which readily formed aqueous soap-like dispersions even after boiling with hydrochloric acid.

The product was tested for emulsifying properties with mineral and vegetable oils as described in Example 7. It was found that a 1% aqueous solution possessed good emulsifying properties for hydrocarbons such as kerosene, being comparable in this respect to other standard emulsifying agents now on the market. Emulsions of such glyceride oils as olive oil could also be prepared by the same process.

The product was also found to possess good wetting properties, when subjected to a standard Draves wetting test. At 30° C. concentrations of 2.5 and 1.25 grams per liter gave sinking times of 13.6 and 29.7 seconds respectively, while at 50° C. the sinking times for the same concentrations were 5.2 and 18.9. These results are comparable to those obtainable with the majority of the standard wetting agents now on the market.

EXAMPLE 10

101 parts of 85% monoethylol cyanamide and 30 parts of glacial acetic acid were stirred and heated slowly to 130° C. in 1 hour and maintained at that temperature for a further 30 minutes. The product on cooling was a translucent, viscous, oil-like syrup, easily soluble in water to a clear solution.

50 parts of moellon degras were dispersed in 90 parts of water containing 1 part of sodium dioctyl sulfosuccinate. One part of the ethylol cyanamide-acetic acid condensation product was dissolved in 10 parts of water and slowly added to the degras emulsion with vigorous stirring, which was continued until a thick, creamy and permanently stable emulsion was obtained. This emulsion was well suited for use in the fatliquoring of leather.

EXAMPLE 11

2 moles of monoethylol cyanamide and 1 mole of butyric acid were slowly heated to 145° C. and maintained at 130–145° C. for 30 minutes. The product on cooling was a pasty material which was readily soluble in water.

Cotton cloth dyed with a direct dye was aftertreated with a 2% aqueous solution of the above condensation product in comparison with soap. It was found that much less dye was removed from the cloth by the condensation product than by a soap solution of the same strength and temperature, indicating the improved fastness of the new product.

EXAMPLE 12

A mixture of 90 parts of monoethylol cyanamide and 60 parts of benzoic acid was slowly heated with stirring to 110° C. The reaction product was a sticky, resinous material which was soluble in water and foamed upon shaking. It was found to be a good demulsifying agent for the resolution of petroleum emulsions of the water-in-oil type, and particularly well suited for the treatment of such emulsions in which the disperse phase is negatively charged, as when the water contained considerable quantities of inorganic salts in solution.

EXAMPLE 13

131 parts of ethoxyethylol cyanamide, prepared as in Example 2, were mixed with 128 parts of palmitic acid. The mixture was heated slowly to 155° C. with stirring whereupon a light, waxy solid was obtained which readily formed solutions in water that foamed upon shaking. Its properties were unchanged even after boiling with hydrochloric acid. When tested by the procedure outlined in Example 7 it was found to be a good textile softening agent.

EXAMPLE 14

48.5 grams of 90% triethoxyethylol cyanamide and 28.4 grams of stearic acid were stirred and heated slowly to 150° C. and held at this temperature for 20 minutes. The product was a viscous, amber-colored liquid readily soluble in water. Its aqueous solutions showed good emulsifying properties.

EXAMPLE 15

526 parts by weight of 88% dihydroxypropylol cyanamide, prepared as in Example 5, were slowly heated to 150° C. in admixture with 532 parts of palmitic acid and held at this temperature for one-half hour. The reaction product was a soft, waxy material which was sparingly soluble in water.

The product was found to be of a good emulsifying agent for preparing emulsions of both vegetable and mineral oils in water, when used as a 1% aqueous solution. It is also a good softening agent for wool and cotton cloth.

EXAMPLE 16

.2 moles of isopropylol cyanamide, prepared as in Example 4, and 1 mole of crude oleic acid were stirred together and heated slowly to 150° C. The product was a dark-brown, viscous liquid giving turbid water dispersions. A portion of this product was sulfonated with concentrated sulfuric acid whereupon a water-soluble material was obtained.

The alkylol cyanamide-oleic acid condensation product was tested for emulsifying properties. A 1% solution was found to emulsify both vegetable and mineral oils in water under neutral, acid and alkaline conditions.

What I claim is:
1. A surface-active composition comprising the condensation product of an aliphatic monocarboxylic acid with a monoalkylol cyanamide.
2. A surface-active composition comprising the condensation product of an aliphatic monocarboxylic acid with a monoethylol cyanamide.
3. A surface-active composition comprising the condensation product of an aliphatic monocarboxylic acid with a monoalkoxyalkylol cynamide.
4. A surface-active composition comprising the condensation product obtained upon heating a mixture of palmitic acid and monoethylol cyanamide.
5. A surface-active composition comprising the condensation product obtained upon heating a mixture of lauric acid and monoethylol cyanamide.

6. Condensation products of the probable structural formula

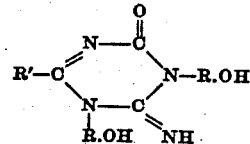

in which R is a member of the group consisting of alkyl and alkoxyalkyl radicals and R' is a member of the group consisting of alkyl and aryl radicals, said products being amorphous, waxy or syrupy materials obtained by heating together a carboxylic acid of the formula R'CO.OH and an alkylol cyanamide of the formula

in which R and R' are as defined above and $x$ is an integer less than 3.

7. Condensation products of the probable structural formula

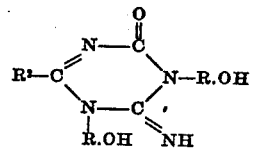

in which R is a member of the group consisting of alkyl and alkoxyalkyl radicals and $R^2$ is an alkyl radical, said products being amorphous waxy or syrupy materials obtained by heating together an aliphatic carboxylic acid of the formula $R^2CO.OH$ and an alkylol cyanamide of the formula $(N\equiv C.NH.R.OH)_x$ in which R and $R^2$ are as defined above and $x$ is an integer less than 3.

8. Condensation products of the probable structural formula

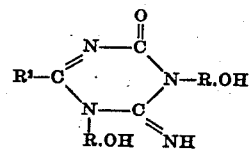

in which R is a member of the group consisting of alkyl and alkoxyalkyl radicals and $R^2$ is an alkyl radical having a molecular weight of 120 or more, said products being waxy materials obtained by heating together an aliphatic carboxylic acid of the formula $R^2CO.OH$ and an alkylol cyanamide of the formula $(N\equiv C.NH.R.OH)_x$ in which R and $R^2$ are as defined above and $x$ is an integer less than 3.

9. A method of producing surface-active agents which comprises heating together an aliphatic monocarboxylic acid and a monoalkylol cyanamide.

10. A method of producing a surface-active agent which comprises heating lauric acid with monoethylol cyanamide.

11. A method of producing a surface-active agent which comprises heating a monocarboxylic acid with a compound of the formula

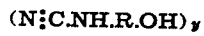

in which R is a member of the group consisting of alkyl and alkoxyalkyl radicals and $y$ is a small whole number less than 3, said compound being obtainable by reacting an alkylene oxide with a member of the group consisting of alkali and alkaline earth metal cyanamides at relatively low temperatures.

WALTER P. ERICKS.